United States Patent

[11] 3,620,652

[72] Inventors Hendrik Alphons Jaspers;
Jacobus Hubertus Abrahams, both of
Emmasingel, Eindhoven, Netherlands
[21] Appl. No. 881,691
[22] Filed Dec. 3, 1969
[45] Patented Nov. 16, 1971
[73] Assignee U.S. Philips Corporation
New York, N.Y.
[32] Priorities Dec. 13, 1968
[33] Netherlands
[31] 6,817,894;
Oct. 22, 1969, Netherlands, No. 6,915,905

[54] COMPRESSOR WITH ROLLING DIAPHRAGM SEAL
10 Claims, 3 Drawing Figs.
[52] U.S. Cl. .................................... 417/439,
74/18.2, 92/98, 417/550
[51] Int. Cl. .................................... F04b 21/00,
F16j 15/50, F01b 19/00

[50] Field of Search ........................ 417/439.
550; 92/182, 98; 74/18.2

[56] References Cited
UNITED STATES PATENTS

| | | | |
|---|---|---|---|
| 2,539,846 | 1.1951 | Lewis et al. | 417/555 |
| 2,614,793 | 10/1952 | Storm | 417/550 X |
| 2,689,533 | 9/1954 | Ericson | 417/555 |
| 3,241,379 | 3/1966 | Rietdijk et al. | 74/18.2 |
| 3,391,646 | 7/1968 | Schlosser | 417/439 |
| 3,488,763 | 1/1970 | Lofquist, Jr | 92/98 X |

*Primary Examiner*—Leonard H. Gerin
*Attorney*—Frank R. Trifari

ABSTRACT: A hermetically sealed compressor having a rolling diaphragm seal between the piston and the cylinder with liquid support for the diaphragm. An inlet valve is formed by a piston ring incorporated in a groove in the portion of the piston wall or located between the rolling diaphragm and the working space. A control device maintains a substantially constant pressure differential across the diaphragm.

COMPRESSOR WITH ROLLING DIAPHRAGM SEAL

The present invention relates to a device for supplying a compressed medium, in particular a hermetically sealed compressor, comprising at least one cylinder in which a piston reciprocates for varying the volume of a working space which includes an inlet valve and an outlet valve. The seal between the piston and the cylinder is formed by a rolling diaphragm which separates two spaces from one another, the first space comprising medium and the second space including a liquid for supporting the rolling diaphragm; the second space comprises a liquid inlet and a liquid outlet, and a control device present for maintaining during operation of the device an at least substantially constant pressure differential across the rolling diaphragm.

A device of the above-mentioned type is known from U.S. Pat. No. 3,241,379. Such a device exhibits the drawback that the inlet valve has a comparatively large dead space and a considerable resistance to flow. The comparatively large dead volume is caused by the fact that the valve body of inlet valves generally is situated in the working space. In the case of outlet valves in which the valve body is generally situated outside the working space, the dead space in principle is much smaller.

A further drawback of the known device is that the space above the rolling diaphragm between the walls of the piston and the cylinder also involve a considerable dead space.

Both factors, comparatively large dead space in the working space and comparatively large resistance to flow of the inlet valve, adversely influence the volumetric efficiency and hence the compression ratio. Furthermore, particularly in compressors having a high compression ratio, high temperatures can occur in the working space as a result of the compression. As a result of this the rolling diaphragm will also be subject to high temperatures, which adversely influences the life of said diaphragm and causes the diffusion of working medium through the diaphragm to increase.

The rolling diaphragm is also subject to the rapid and large pressure variations which occur in the working space. Particularly when the liquid has become slightly compressible as a result of diffusion of working medium through the rolling diaphragm, said pressure variations have an unfavorable influence on the life of the rolling diaphragm.

Finally, particularly in the larger type of compressors, the inlet valves are rather complicated and hence comparatively expensive.

It is the object of the present invention to avoid the said drawbacks.

In order to realize this, the device according to the invention is characterized in that at least the inlet valve is constituted by at least one piston ring accommodated in a groove in that part of the piston wall or cylinder wall which is situated between the rolling diaphragm and the working space and which piston ring separates the first space from the working space; an open communication is always present between the space in the groove behind the piston ring and the working space, with the first space comprising at least one aperture for supplying medium thereto.

In this manner a device is obtained in which the dead space of the working space is considerably reduced by introducing the piston ring, and by the fact that the space above the rolling diaphragm does no longer form part of the working space.

Moreover, as a result of the large passage, the resistance to flow between the piston wall and cylinder wall arranged with a large amount of play and between the groove and the piston ring, is small. As a result of this the volumetric efficiency and the compression ratio are considerably improved.

The use of piston rings is comparatively cheap and can be carried out structurally in a comparatively simple manner. The open communication between the space in the groove behind the piston ring and the working space can be formed, for example, by bores in the piston or by radially extending grooves in the side of the piston ring facing the working space.

Since the space above the rolling diaphragm is separated from the working space, the rolling diaphragm will not be troubled by the high temperatures in the working space occurring particularly in compressors having a large compression ratio and by the large pressure variations in the working space. The rolling diaphragm remains cool which restricts the diffusion of working medium and favors the life of the rolling diaphragm considerably.

In one embodiment of the invention, the section of the piston situated between the connection of the rolling diaphragm and the working space is constituted by two or more piston parts, the diameter of which decreases in the direction of the working space; the annular surfaces formed by the transitions of said piston parts are each capable of varying the volume of a further working space. At least one piston ring is present between the first space and the nearest further working space, and at least two piston rings are present each time between the further working spaces mutually and between the working space and the nearest further working space; these rings separate the said spaces from each other pairwise, the piston rings being each accommodated in a groove situated in the part of the piston wall or cylinder wall which is situated between each pair of the said spaces, the annular spaces situated between the piston rings separating each pair of further working spaces respectively the working space and the nearest further working space from one another. Each of said spaces communicates with at least one buffer space, an open communication being furthermore always present with each piston ring between the space in the associated groove behind the piston ring and the space situated on the side of the piston ring facing the working space. In this manner a multistage compressor is obtained having a considerably better compression ratio than the known devices, since each stage in itself has an improved compression ratio for the above-mentioned reasons, while the construction is comparatively simpler. Moreover, the rolling diaphragm remains cool during operation of the device, and is not troubled by the large pressure variations in the working spaces, which is favorable for its life.

In the device according to the invention a control device is present for maintaining an at least substantially constant differential pressure across the rolling diaphragm during operation, and thus holding the rolling diaphragm stretched.

In certain circumstances, however, it may occur that in the device in which the rolling diaphragm faces the first space with its concave side and the pressure in the said space hence is higher than the pressure in the liquid space, the suction pressure of the medium falls below a particular permitted minimum valve. In order to prevent the formation of pleats of the rolling diaphragm, which may result in destruction of said diaphragm, a control member is present which is incorporated in communication between the first space and the second space or one of the further working spaces, this member releasing the communication when the suction pressure of the device falls below a given minimum value. Compressed medium will then flow from the relative working space to the first space, and will ensure that the pressure level there does not drop to an inadmissible value so that the rolling diaphragm remains in the stretched condition.

In a favorable embodiment of the invention, the piston comprises a chamber the boundary of which on the side remote from the working space is constituted by a further piston which can reciprocate in the piston in the axial direction thereof and is connected via a valve stem, to a valve body which can cooperate with a valve seating incorporated in the end face or in one of the annular surfaces of the piston. The valve opens in the direction of the working space or one of the further working spaces for releasing the communication between said space and the chamber, an open communication being present between the first space and the chamber, and resilient means being present which exert a force in the direction of the working space on the assembly of further piston valve stem and valve body in such manner that the valve body releases the communication between the first space and the working space, or one of the further working spaces, when the suction pressure of the device falls below a particular minimum valve. An abutment member is present which limits the movement of the assembly in the direction of the working space. By accommodating the control member in the piston and choosing as a communication between the first space and the working space or one of the further working spaces a duct through the piston, a compact compressor is obtained in which the dead space of the working space and further working space, respectively, is minimum and the control member is better protected from damage by external causes.

In order that the invention may be readily carried into effect, a few examples thereof will now be described in greater detail, with reference to the accompanying drawings which are not drawn to scale:

Figure 1:
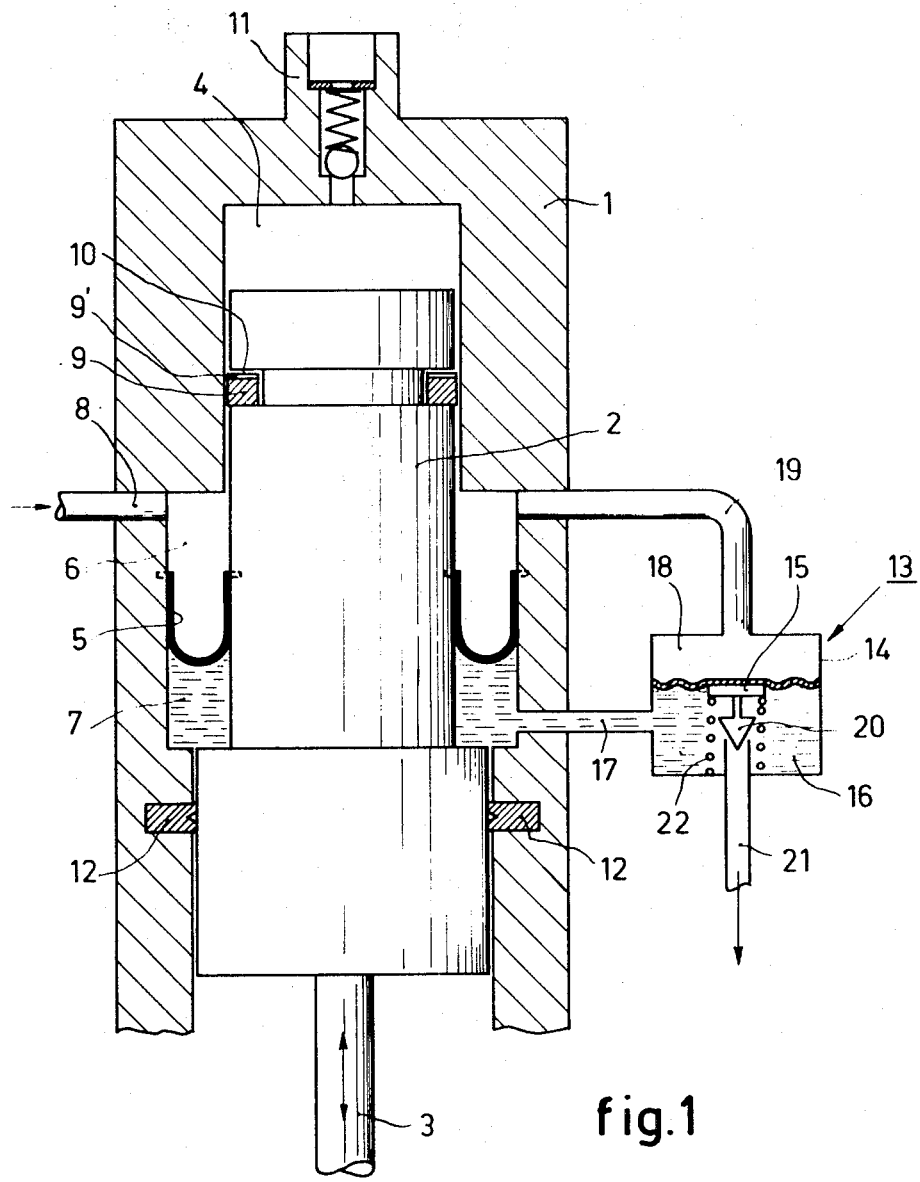
FIG. 1 is a device for supplying compressed medium in which the compression takes place in one working space.

Reference numeral 1 in FIG. 1 denotes a cylinder, in which a piston 2 reciprocates with a large amount of play, which piston is connected through a piston rod 3 to a gear not shown and is capable of varying the volume of a working space 4. As a seal between the piston wall and the cylinder wall, a rolling diaphragm 5 is present which separates a first space 6 from a liquid space 7 which contains lubricating oil. The first space 6 includes duct 8 for the supply of medium to be introduced into this space.

Between the working space 4 and the first space 6 a piston ring 9 is provided which is accommodated in a groove 10 in the wall of the piston; it is also possible to accommodate the piston ring in a groove in the cylinder wall. The side 9' of the piston ring 9 comprises radially extending grooves, which prevent the side of the piston ring and the oppositely located wall of the groove 10 from constituting a seal. A spring-loaded outlet valve 11 is incorporated in the wall of the working space 4.

The device furthermore comprises a control device which ensures that the differential pressure across the rolling diaphragm 5 remains substantially constant. This control device includes a unidirectionally operating pump ring 12, which can supply lubricating oil to the liquid space 7, and a control valve 13. The control valve 13 has in a housing 14, a diaphragm 15 that separates two spaces from each other; one of these spaces 16 communicates via a duct 17 with the liquid space 7, and the other space 18 communicating via a duct 19, with the first space 6. The diaphragm 15 supports a valve 20 which can close the exhaust duct 21. Furthermore a compression spring 22 is present which ensures that a given desired differential pressure prevails across the diaphragm 15.

If for some reason, more liquid is exhausted from the liquid space 7 than is supplied by the pump ring 12, as a result of which the pressure in the liquid space 7 drops, the diaphragm 15 will move downwards as a result of the lower pressure consequently occurring in the space 16. The valve 20 will then fully or partly close the exhaust duct 21, until sufficient liquid is again present in the space 7, and the original pressure differential is again reached across the rolling diaphragm 5.

Conversely, if for some reason, more liquid is supplied to the space 7 than is exhausted, the pressure in the space 7 increases and hence the pressure in the space 16 as a result of this, the diaphragm 15 and hence the valve 20 move upwards, so that the exhaust duct 21 is more released and sufficient extra liquid can flow away until the originally adjusted differential pressure across the rolling diaphragm 5 is reached again. In this manner the rolling diaphragm is always supported by sufficient liquid.

Of course, other embodiments of the control valve are possible, and the oil supply may take place differently, for example, by connecting the liquid space 7 to an oil container via a system of ducts in which an oil pump is incorporated. The container from which the oil can be obtained and to which it can be returned again after circulation may be the pump of the device.

The operation of the device is as follows. When the piston moves downwards, and the pressure in the space 4 becomes lower than in the space 6, the side 9' of the piston ring 9 which is provided with radially extending grooves engages the upper wall of the groove 10, but forms no seal with the said groove. Medium is then sucked in the first space 6 via the aperture 8, flowing along the piston wall and cylinder wall and through the ducts and grooves between the piston ring 9 and the groove 10 to the working space 4. As a result of the large play between the piston wall and the cylinder wall and the large passage of the ducts between the piston ring 9 and the groove 10, the resistance to flow is small.

After the piston 2 has passed the lowermost dead position and moves upwards, the lower side of the piston ring 9 engages the lower side of the groove 10, when the pressure in the space 4 becomes larger than in the space 6, and a good seal is formed so that the medium present in the working space cannot flow back to the space 6.

The medium in the working space is then compressed and leaves the working space via the outlet valve 11 which opens when the pressure in the working space exceeds the pressure exerted by the spring and by the medium in the exhaust duct.

Figure 2:
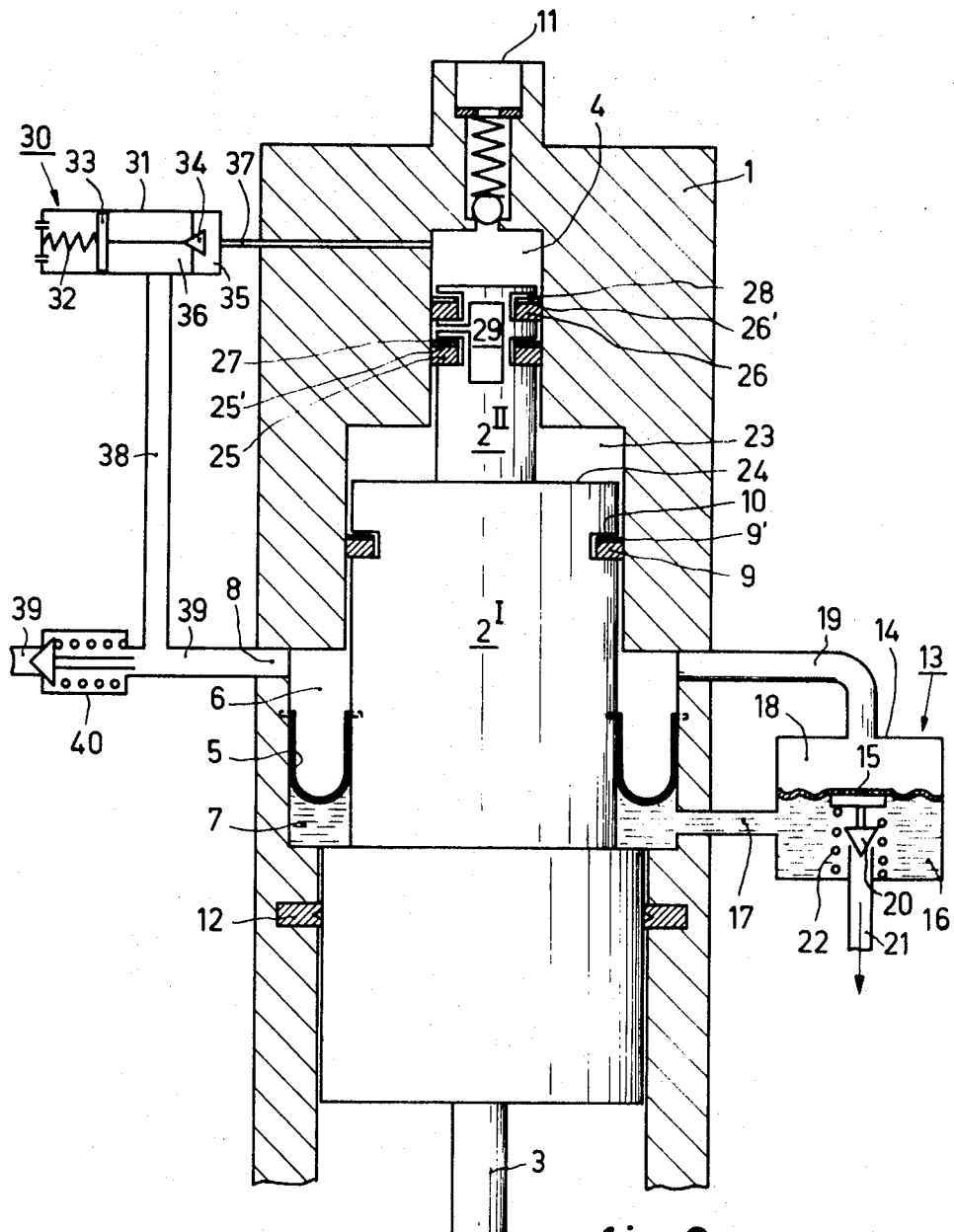
FIG. 2 shows a device for supplying compressed medium in which the compression takes place in two steps and which device furthermore comprises a control member which can release compressed medium from the working space to the first space.

FIG. 2 shows a two-stage compressor, in which the same reference numerals are used as in FIG. 1 for corresponding components. The piston section situated between the connection of the rolling diaphragm 5 and the working space 4, consists of two stepped piston parts $2^I$ and $2^{II}$ which cooperate with a large amount of play with the parts of the cylinder 1 which likewise have a stepped construction. In this manner a further working space 23 is created, the volume of which can be varied by the annular surface 24. The piston ring 9 separates the space 6 from the space 23.

Two piston rings 25 and 26 are incorporated in the wall of the piston part $2^{II}$ in grooves 27 and 28, respectively. On their upper sides 25' and 26', respectively, both piston rings have radially extending grooves. The annular space situated between said piston rings, which separate the space 4 from the space 23, communicates with a buffer space 29 which is in this case formed by a cavity in the piston part $2^{II}$. Of course it is also possible to arrange this space in the cylinder wall. However, in that case it should be insured that this buffer space does not communicate directly with the spaces 23, and 4, respectively, during the whole stroke of the piston.

Furthermore a control member 30 is present which includes a housing 31 in which a compression spring 32 is accommodated which is connected via the piston 33 to the valve 34, which in the closed position separates a space 35 from a space 36. The space 35 communicates via a duct 37 with the working space 4, while the space 36 communicates via a duct 38 with the suction duct 39. The suction duct communicates with the aperture 8 of the space 6 and comprises a spring-loaded nonreturn valve 40.

The operation of the device is as follows: At the normal desired suction pressure, the valve 40 is opened and the control valve 30 is closed. The side 9'of the piston ring 9 provided with radially extending grooves engages the upper wall of the groove 10 when the pressure in the space 23 is lower than in the space 6. Medium can then flow from the space 6 to the space 23. Medium can also flow from the space 23 to the buffer space 29, when the pressure in the buffer space 29 is lower than in the space 23 and the side 25' of the piston ring 25 engages the upper wall of the groove 27.

Furthermore, medium from the buffer space 29 can flow to the space 4 when the pressure in the space 29 is higher than in the space 4 and the side 26' of the piston ring 26 engages the upper wall of the groove 28. When the piston moves downwards, and the volume of the space 23 becomes larger, the pressure therein may become so low that medium is sucked from the space 6. During the subsequent upward stroke of the piston, said medium is compressed and flows at least partly to the buffer space 29, as soon as the pressure in the space 23 has reached that of the buffer space 29. Medium from the space 29 can flow to the space 4, when the pressure in the working space drops below that in the space 29 which will be the case when medium from the working space is forced to the outlet valve 11 and the piston moves downwards. For a favorable operation of the compressor, the volume of the buffer space 29 should be suitable chosen and may be, for example, two to three times the volume of the space 23.

The operation of the control member is as follows: During normal operation of the device the valve 40 is open and the valve 34 is closed. This latter is achieved by a suitable choice of the compression spring 32, of the surface of the piston 33 and of the effective cross section of the valve 34 with the given suction pressure in the space 36 and variable pressure in the space 35 and working space 4, respectively, all this in such manner that the force exerted to the left by the suction pressure on the piston 33 and the resilience to the right are the predominant forces. When the suction pressure in the duct 39 on the left of the valve 40 would drop suddenly, first the valve 40 closes. Since the pressure in the space 36 also drops as a result of the compressor effect, the force to the left exerted on the piston 33 will become smaller than the resilience to the right so that the valve 34 opens. Since during operation the variable pressure in the working space is always higher than the suction pressure, medium from the space 4 and possibly also from the buffer space 29 will flow to the space 36 and through ducts 38 and 39 to the space 6. By choosing the volume of the ducts 38 and 39 to be sufficiently large, the pressure variation in the space 36 can be kept sufficiently small during the discharge of medium from the working space 4 and the buffer space 29 via the control member, so as to prevent the valve 34 from being closed again.

Since the pressure level in the working space 4 has dropped, the outlet valve 11 remains closed. The result is that a stationary condition is obtained in which medium circulates from the space 6 via the space 23 and 29 to space 4 and back to space 6 via the control member. In this manner the pressure above the rolling diaphragm is kept constant at a given value in such manner that the pressure differential across the rolling diaphragm is sufficiently large to ensure that said diaphragm cannot form pleats and be destroyed.

Such a compressor is particularly suitable for use as a control compressor in a hot-gas engine, in which the outlet 11 communicates with a storage container for working medium. The container communicates via a medium supply duct with a control valve incorporated therein, with the working space of the engine, while the suction duct 39, as a medium outlet duct, also communicates with the working space of the engine via a control valve. When the control valve in the suction duct 39 is closed, the pressure in the spaces 6 and 36 and ducts 38 and 39 will fall below the adjusted minimum suction pressure due to the compressor effect, and the valve 4 will be opened so that the compressor again operates unloaded as described above.

Figure 3:
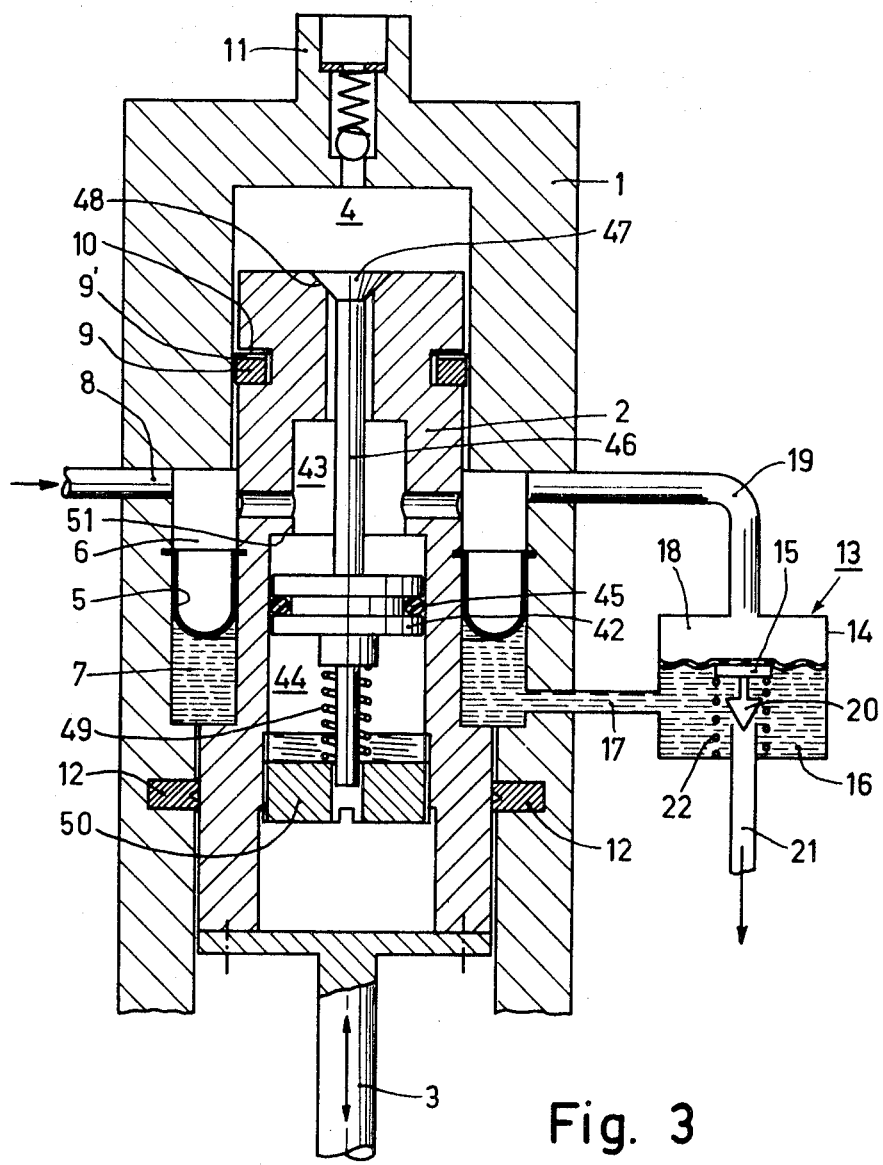
FIG. 3 is a device for supplying compressed medium which corresponds to that shown in FIG. 1, but which is provided with a control member accommodated in the piston and capable of communicating the working space with the first space.

In the compressor shown in FIG. 3, the same reference numerals are used for corresponding components as in FIG. 1. The operation of this compressor is similar to that of FIG. 1, and thus is not described again. The only difference from the compressor shown in FIG. 1 is that the present compressor has a control member which is capable of communicating the working space 4 with the first space 6 when the suction pressure above the rolling diaphragm 5 falls below a particular minimum value. Inside the piston 2, a piston 42 is disposed which separates a chamber 43 from a space 44. An O-ring 45 incorporated in a groove in the wall of the piston 42 serves as a seal between these spaces.

The piston 42 is connected via a valve stem 46 to a valve body 47, which is capable of cooperating with a valve seating 48 in the end face of the piston 2 and permits or blocks communication between the chamber 43 and the working space 4. On the lower side of the piston 42 a compression spring 49 exerts a force in the direction of the working space 4 on the assembly of piston 42, valve stem 46, and valve body 47. The force is adjustable by means of an adjusting screw 50 which cooperates with that part of the innerwall of the piston 2 which bounds the space 44.

The space 43 is in open communication with the first space 6, so that the annular upper surface of the piston 42 feels the suction pressure. Furthermore, the medium pressure which prevails in the working space 4 also acts upon the upper surface of the valve body 47.

A comparatively low pressure prevails in the space 44, for example, atmospheric pressure. An abutment member 50 bounds the movement of the piston 42 and hence the valve body 47 upwards.

The operation of the control member is as follows. 171 The compression spring 49 is adjusted so that at the normal suction pressure the force which is exerted by the medium in the chamber 43 on the annular upper surface of the piston 42 and is directed downwards, overcomes the upward force of the compression spring. Since the pressure in the space 44 is comparatively low, the upward force exerted on the piston 42 by the medium in said space is also comparatively low. The valve body 47 then bears in the valve seating 48, so that there is no communication between the chamber 43 and the working space 4. When the suction pressure comes below a particular minimum value, as a result of which the pressure differential across the rolling diaphragm is no longer maintained and there is danger of formation of pleats and hence destruction of said diaphragm, the force exerted by the compression spring 49 becomes the predominant force. The assembly of the piston 42, valve stem 46 and valve body 47 is hence pushed upwards. The valve body 47 then releases from the valve seating 48, so that compressed medium flows from the working space 4 via the chamber 43 to the first space 6. The pressure above the rolling diaphragm 5 hence increases. This results in the pressure differential across the rolling diaphragm again assuming an acceptable value so that the diaphragm is protected from destruction by the formation of pleats. Since as a result of the medium flow from the working space 4 to the working space 6 the pressure in the working space 6 has dropped, the outlet valve 11 remains closed. The results in a stationary condition of the compressor, with open communication between the first space 6 and the working space 4, such that the compressor unloaded and no medium is pumped through the outlet valve 11.

In the embodiment of the device described, piston rings are always used in the piston wall and the rolling diaphragm always faces the liquid space 7 with its convex side. Of course it is also possible to arrange the piston rings in grooves in the cylinder wall. Embodiments of the device according to the invention in which the rolling diaphragm faces the liquid space with its concave side and the pressure in said space hence is always larger than in the first space 6 are also possible.

It will be obvious from the above that the invention provides an extremely interesting hermetically sealed device for supplying compressed medium with a good efficiency and of a comparatively simple structure in which the rolling diaphragm is not subjected to large pressure variations and high temperatures in the working space and therefore has a good lifetime.

What is claimed is:

1. A device for supplying a compressed medium, particularly a hermetically sealed compressor, comprising at least one cylinder in which a piston reciprocates for varying the volume of at least one working space which comprises an inlet valve and an outlet valve, a seal between the piston and the cylinder being formed by at least one rolling diaphragm, which separates two spaces from each other, the first space comprising medium and the second space comprising a liquid for supporting the rolling diaphragm, said second space comprising a liquid inlet and a liquid outlet, a control device being present for maintaining during operation of the device an at least substantially constant pressure differential across the rolling diaphragm, characterized in that at least the inlet valve is constituted by at least one piston ring incorporated in a groove in that part of the piston wall or cylinder wall which is situated between the rolling diaphragm and the working space and which piston ring separates the first space from the working space, an open communication being always present between the space in the groove behind the piston ring and the working space, the first space comprising at least one aperture for the supply of medium thereto.

2. A device as claimed in claim 1, in which the section of the piston situated between the connection of the rolling diaphragm and the working space is formed by two or more piston parts the diameter of which decreases in the direction of the working space, the annular surfaces formed by the transitions of said piston parts each being capable of varying the volume of a further working space, characterized in that at least one piston ring is present between the first space and the nearest further working space, and at least two piston rings are present between the further working spaces mutually and between the working space and the nearest further working space, which rings separate the said spaces pairwise from each other, the piston rings being each incorporated in a groove situated in the part of the piston wall or cylinder wall which is situated between each pair of the said spaces, the annular spaces situated between the piston rings separating each pair of further working spaces respectively the working space and the nearest further working space from one another each communicating with at least one buffer space, an open communication being furthermore always present with each piston ring between the space in the associated groove behind the piston ring and the space situated on the side of the piston ring facing the working space.

3. A device as claimed in claim 1 in which the rolling diaphragm faces the first space with its concave side, characterized in that a control member is present which is incorporated in a communication between on the one hand the first space and on the other hand the working space or one of the further working spaces, said member releasing the communication when the suction pressure of the device falls below a particular minimum valve.

4. A device as claimed in claim 3, characterized in that a chamber is present in the piston the boundary of which on the side remote from the working space is formed by a further piston which reciprocates therein in the axial direction of the piston and is connected, via a valve stem, to a valve body which can cooperate with a valve seating incorporated in the end face or in one of the annular surfaces of the piston and which opens in the direction of the working space or one of the further working spaces for releasing communication between said space and the chamber, an open communication being present between the first space and the chamber and resilient means being present which exert a force on the assembly of further piston, valve stem and valve body in the direction of the working space in such manner that the valve body releases the communication between the first space and the working space, or one of the further working spaces, when the suction pressure of the device falls below a particular minimum value, an abutment member being furthermore present which limits the movement of the assembly in the direction of the working space 5. Apparatus for supplying a compressed gaseous medium and operable with means for driving the apparatus, comprising: a cylinder with a bore, a piston reciprocally movable within said bore by said drive means, the piston having first and second axially spaced parts, the first part defining with the bore a variable-volume working space, inlet and outlet valves to said working space, a rolling diaphragm seal secured between said bore and the second part of the piston, a space for gas being defined above the seal and a space for liquid defined below the seal, inlet and outlet means to both said gas and liquid spaces, and control means communicating with said gas and liquid spaces for maintaining a substantially constant pressure differential across said seal, a portion of the piston intermediate the first and second parts of the piston formed as an annular groove, said inlet valve to the working space comprising a piston ring disposed in said groove and extending outward and engaging the bore and forming a one-way valve permitting a flow only into the working space from the gas space.

6. Apparatus according to claim 5 operable with a source of compressible gaseous medium, said inlet to the gas space communicating with said source for receiving said medium which is flowable from the gas space to the working space through said one-way inlet valve to working space.

7. Apparatus according to claim 6 operable with a source of liquid for supporting the seal, said inlet to the liquid space being in communication with said liquid source, the apparatus further comprising pump means for pumping liquid from said source of liquid to said liquid space.

8. Apparatus according to claim 5 wherein the piston has a projection having a near end extending from said first part of the piston and having smaller diameter than said first part, and a remote end forming with the bore a second working space, the cylinder bore having a reduced diameter adjacent said projection and conforming thereto, said projection having a pair of spaced annular grooves intermediate its near and remote ends, a piston ring in each groove forming with the bore a one-way valve communicating into the second working space, the projection further defining internally a buffer space with duct means communicating said buffer space through the one-way valve to the second working space.

9. Apparatus according to claim 5 wherein said seal has a convex surface facing said liquid space and a concave side facing the gas space, said control member comprising a second part which selectively permits and blocks communication between the working space and said gas space.

10. Apparatus according to claim 9 wherein said piston has an axial bore for communicating said working space and the gas space, and said control means second part comprises a valve cooperating with said bore in the piston with means urging the valve to open when pressure in the gas space is less than pressure in the liquid space.

* * * * *